United States Patent
Brake et al.

(10) Patent No.: US 10,949,611 B2
(45) Date of Patent: Mar. 16, 2021

(54) USING COMPUTER-IMPLEMENTED ANALYTICS TO DETERMINE PLAGIARISM OR HEAVY PARAPHRASING

(71) Applicant: International Business Machines Corporation, Armonk, TX (US)

(72) Inventors: Kyle M. Brake, Dublin, OH (US); Stephen A. Boxwell, Columbus, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 16/248,225

(22) Filed: Jan. 15, 2019

(65) Prior Publication Data

US 2020/0226206 A1 Jul. 16, 2020

(51) Int. Cl.
*G06F 40/194* (2020.01)
*G06F 40/30* (2020.01)
*G06F 40/247* (2020.01)
*G06F 40/284* (2020.01)

(52) U.S. Cl.
CPC .......... *G06F 40/194* (2020.01); *G06F 40/247* (2020.01); *G06F 40/284* (2020.01); *G06F 40/30* (2020.01)

(58) Field of Classification Search
CPC .................................................. G06F 40/194
See application file for complete search history.

(56) References Cited

U.S. PATENT DOCUMENTS

| 6,976,170 | B1 | 12/2005 | Kelly |
| 8,620,872 | B1* | 12/2013 | Killalea ............... G06F 40/194 |
| | | | 707/687 |
| 2005/0010863 | A1* | 1/2005 | Zernik .................. G06F 40/194 |
| | | | 715/229 |
| 2005/0060643 | A1 | 3/2005 | Glass et al. |
| 2014/0075566 | A1 | 3/2014 | Farkash et al. |
| 2016/0196342 | A1 | 7/2016 | Kim et al. |

OTHER PUBLICATIONS

Gruner, Tool Support for Plagiarism Detection in Text Documents, ACM 2005. (Year: 2005).*
Gruner, et al., "Tool Support for Plagiarism Detection in Text Documents," ACM 2005. (Year: 2005).*
Schmidt, Andreas, et al., "Detection and Visual Inspection of Highly Obfuscated Plagiarisms", Proc. Hawaii Int'l. Conf. on System Sciences, pp. 4113-4122 (2016).

\* cited by examiner

*Primary Examiner* — Feng-Tzer Tzeng
(74) *Attorney, Agent, or Firm* — Diana R. Gerhardt; Jack V. Musgrove

(57) ABSTRACT

Current plagiarism checkers can determine if a document has extensively copied from another but these checkers fail when a document is filled with synonyms. The present invention offers a means of detecting plagiarism involving the use of synonyms or heaving paraphrasing. A source passage from a pertinent corpus is modified by generating augmented tokens which include synonyms for the various terms in the passage. Text analysis may be required to confirm the semantic meaning of a term. The modified passage may be a regular expression. The modified passage can then be compared to a suspect passage using a trigram scorer. If possible plagiarism is detected, an alert message is sent to a reviewer with the passage of interest, the source passage, and an identification of the related corpus.

17 Claims, 4 Drawing Sheets

USING COMPUTER-IMPLEMENTED ANALYTICS TO DETERMINE PLAGIARISM OR HEAVY PARAPHRASING

BACKGROUND OF THE INVENTION

Field of the Invention

The present invention generally relates to text analysis, and more particularly to a computer-implemented method of detecting plagiarism and heavy paraphrasing.

Description of the Related Art

Plagiarism has long been a problem, in academic circles as well as other areas such as professional writings, entertainment (novels or movies) and news reports. The commonplace use of computers and the advent of the Internet have made it much easier to plagiarize existing works. An author or student can easily search a given topic using an internet search engine and find ample material from which to copy. A wide variety of methods have been devised for detecting plagiarism. Previously the primary method was manual detection, but this approach is extremely time-consuming and requires individuals with a high degree of knowledge on the subject. Manual detection is also impractical in those cases where a questionable passage could potentially be compared to dozens of source works. Automated methods have thus been developed which can more easily compare suspect text to a very large number of documents (corpora).

The simplest automated approach is to do a direct (verbatim) comparison of a snippet of text (a string) to text passages in a corpus. Of course this approach is easily circumvented by inserting a word or two into an existing sentence, or removing a word or two. This approach can also be computationally intensive. An improved approach involves the comparison of n-grams. An n-gram is a sequence of n items from text or speech (two items is a bigram, three items a trigram, etc.). N-grams can be extracted from suspect text and then compared to n-grams from reference corpora. Fingerprinting is currently the most commonly used technique for plagiarism detection, and relies on n-gram analysis. A concordance of n-grams is created for a given document which is then considered representative of the document (its "fingerprint"). The fingerprint of a document can then be compared to fingerprints of existing documents in reference corpora. If enough matches are found, the document can be marked for further investigation as a potentially plagiaristic work. Other popular plagiarism detection methods include bag-of-words analysis (relying on vector space retrieval to find pair-wise similarities), citation analysis (looking at similar patterns in citations and reference information identified in texts), and stylometry (statistical methods for characterizing a particular author's writing style). When a plagiarism checker determines that a document has extensively copied from another, it can provide a reviewer with an annotated document highlighting copied text and linking to the document it was copied from.

SUMMARY OF THE INVENTION

The present invention in at least one embodiment is generally directed to a method of detecting plagiarism with a certain degree of confidence by receiving a passage of interest, receiving a corpus having a source passage, wherein the corpus is related to the passage of interest, associating at least one synonym with a term in the source passage, creating a modified passage using the synonym, comparing the modified passage to the passage of interest to determine that the modified passage is similar to the passage of interest, and responsively providing an indication that the passage of interest is likely plagiarized. The comparison may use a trigram scorer to determine that the modified passage is similar to the passage of interest. In a preferred implementation the modified passage has an augmented token which includes the term and the at least one synonym; the augmented token may take the form of a regular expression. In order to select the particular related corpus, one or more entities can be extracted from the passage of interest, and the corpus is identified as being related to the passage of interest based on the one or more entities. Multiple synonyms can be associated with multiple terms in the source passage to form the modified passage. The provision of the indication can include sending an alert message to a reviewer wherein the alert message includes the passage of interest, the source passage, and an identification of the related corpus.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Plagiarists use many methods for copying information from a source and claiming it as their own. One method, sometimes referring to as "rogeting" (a reference to Roget's thesaurus), involves substituting a synonym for a word in a sentence, phrase or other text fragment. Currently, synonyms are not detected as potential plagiarism by plagiarism checkers. These sorts of paraphrased documents are nearly impossible to determine programmatically whether or not they have been plagiarized. Heavily paraphrased documents can thus go unnoticed by a reviewer. Take for example this excerpt regarding John Glenn:

"John Herschel Glenn Jr. (Jul. 18, 1921-Dec. 8, 2016) was a United States Marine Corps aviator, engineer, astronaut, and United States Senator from Ohio. In 1962 he became the first American to orbit the Earth, circling it three times."

The following sentence heavily synonymizes the above: "John Glenn Jr. was a U.S.M.C. pilot, engineer, cosmonaut and U.S. politician from Columbus, Ohio who in the early 1960's was the first American to circumnavigate the planet in space."

The above passages are very different, word for word, but are nearly identical in meaning and composition due to the second's extensive use of synonyms. Accordingly, conventional plagiarism detectors, including trigram scorers, would allow this sentence to go unnoticed.

It would, therefore, be desirable to devise an improved method of plagiarism detection that could alert a reviewer to potential copying via the use of synonyms or heavy paraphrasing. It would be further advantageous if the method could be easily applied to augment conventional computational techniques for plagiarism detection. The present invention in its various embodiments achieves these and other advantages by associating synonyms with terms in the source passage to create a modified passage with augmented tokens, and then compares the modified passage to the candidate passages. In an exemplary embodiment a trigram scorer is used to detect plagiarism. Trigram scorers are particularly susceptible to single-term synonym misses. For example, if the trigram <be, quarterback, Packers> appears in a statement, but the passage contains only <be, QB, Packers>, the trigram will not match and the scorer will return a low value (when perhaps a high value would be merited, considering that "quarterback" and "QB" have close semantic values). Higher order n-gram scorers (trigram and higher) are especially vulnerable to this, as each individual token appears in a large number of trigrams and can therefore do disproportionately great damage to the fit of the trigram model. Because the present invention in at least some embodiments makes use of synonyms explicitly as part of the trigram itself, it can ease this pressure on exact-string matches. The present invention can thus be used to present suspect passages as potential copies to a reviewer while current plagiarism checkers would not.

Figure 1:
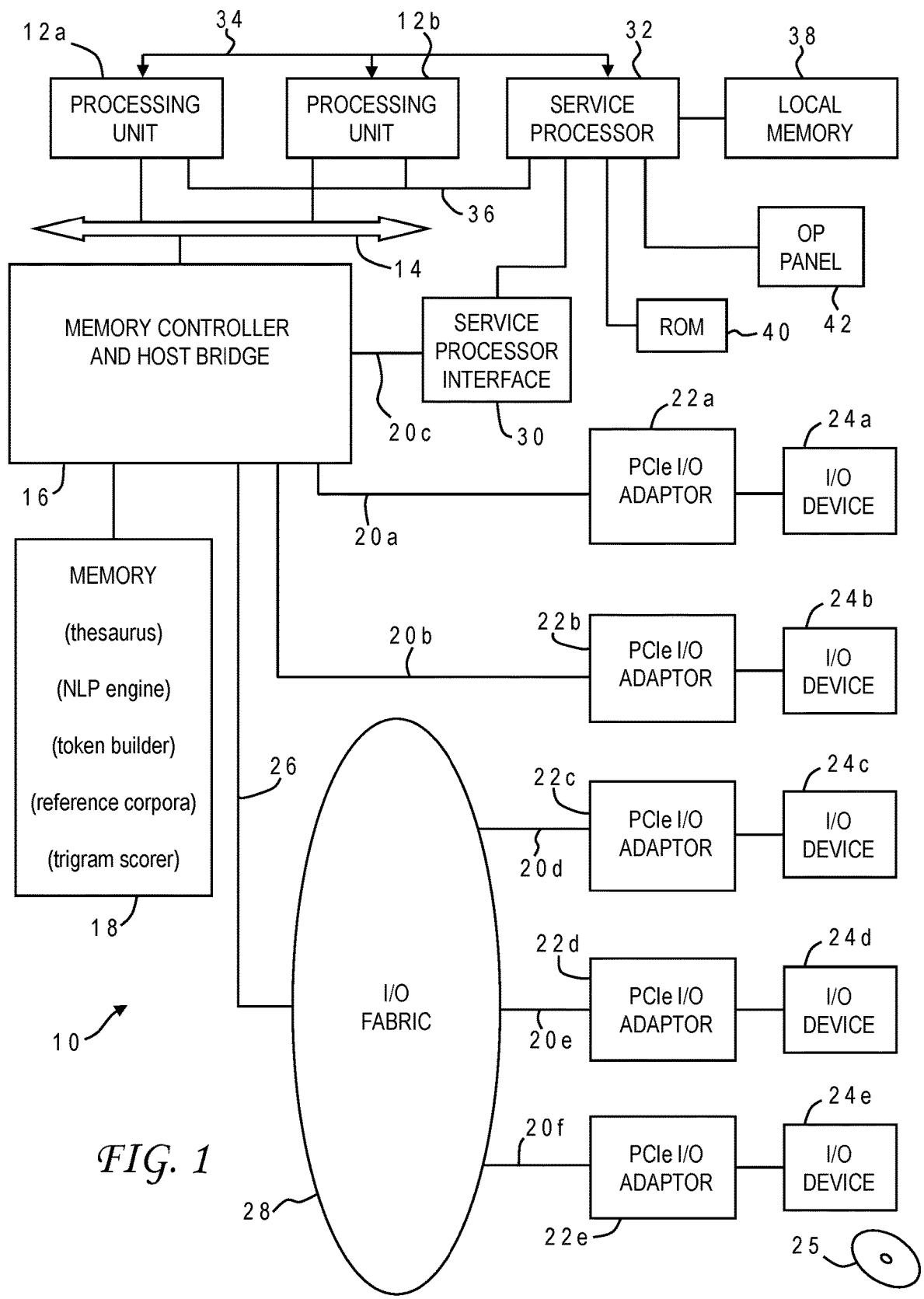
FIG. 1 is a block diagram of a computer system programmed to carry out plagiarism detection in accordance with one implementation of the present invention.

With reference now to the figures, and in particular with reference to FIG. 1, there is depicted one embodiment 10 of a computer system in which the present invention may be implemented to carry out plagiarism detection. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention, including a token builder for created augmented tokens using synonyms, a natural language processing (NLP) engine, and a trigram scorer, as well as reference material such as a thesaurus and one or more corpora of existing documents which are to be checked against to determine possible plagiarism.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the plagiarism detection application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory

18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a plagiarism detection process that uses novel augmentation techniques to detect possible plagiarism using synonyms or heavy paraphrasing. Accordingly, a program embodying the invention may additionally include conventional aspects of various plagiarism detection tools as well as text analysis tools, and these details will become apparent to those skilled in the art upon reference to this disclosure.

Figure 2:
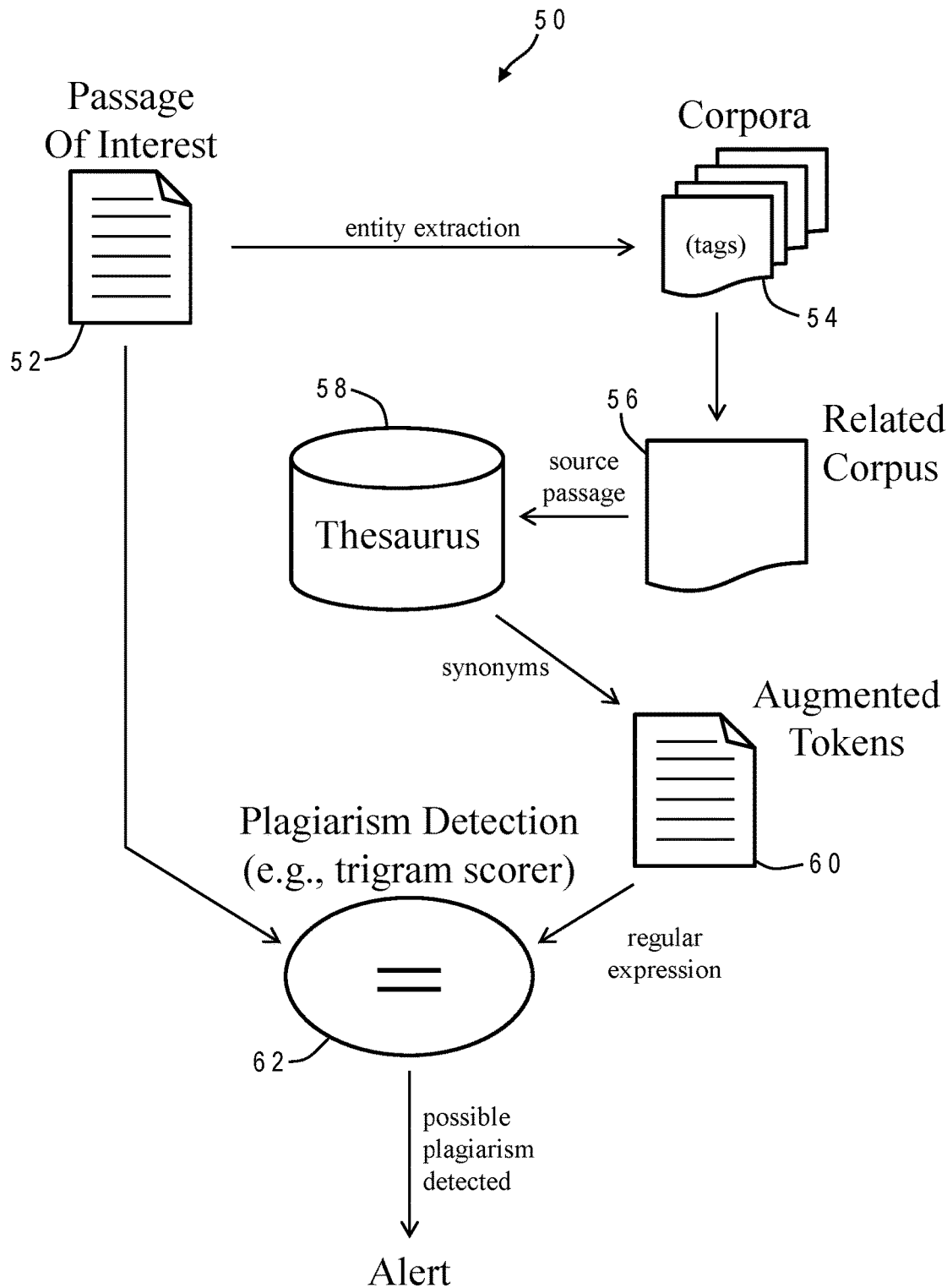
FIG. 2 is a pictorial representation of a plagiarism detection mechanism constructed in accordance with one implementation of the present invention.

Referring now to FIG. 2, there is depicted a graphical representation of a plagiarism detection mechanism 50 constructed in accordance with one implementation of the present invention. Plagiarism detection mechanism 50 begins with a passage of interest 52 as an input for processing. Passage 52 may be one which has already been identified through manual means as being suspect, that is, copied in whole or in part from another source, or may be one of many text fragments from a document to be analyzed automatically, such as an essay, a news article, a journal paper, etc. The text fragment may be any span of text on which text analysis can be performed, the most common lengths being sentence and paragraph, although it is possible to work on larger or smaller spans. Passage 52 is subjected to text analysis to extract one or more entities such as person, location, organization, and particular objects, or extract other keywords useful in identifying a context of the passage. Text analysis is known in the art pertaining to natural language processing (NLP) and typically uses a text annotator program to search text documents and analyze them relative to a defined set of word types. The text annotator can generate linguistic annotations within the document to highlight concepts and entities that might be buried in the text. These entities and/or keywords can then be compared to an existing collection 54 of corpora in order to find pertinent documents that might relate to the passage, in order to focus the plagiarism analysis on only the most relevant existing text rather than extensively searching through all available corpora. A related corpus 56 may be identified using one or more tags previously generated for the corpus, wherein at least some of the tags match the entity extracted from passage 52. Tags can be generated automatically using conventional routines based on the content of the corpus. A particular corpus might be selected if it has enough matching tags (e.g., three or more), or if it is at or near the top of a list of corpora having matching tags (e.g., the two corpora that have the most matching tags). Thus, using the foregoing example, if passage 52 refers to "John Glenn", the related corpus 56 is one which has previously been identified as containing references to that individual.

A source passage is passed from related corpus 56 to a thesaurus agent 58 to obtain likely synonyms for terms in the source passage. The synonyms can then be combined as described further below to generate augmented tokens 60 representing the source passage. In the exemplary embodiment the augmented tokens form a regular expression. That regular expression is then submitted to a plagiarism detector 62 along with passage of interest 52. Plagiarism detector 62 may be of various kinds, but in the preferred implementation it is a trigram scorer, i.e., it generates a score indicative of likely plagiarism based on the matching of one or more trigrams from the regular expression with one or more trigrams from passage 52. The plagiarism check may be performed successively against multiple source passages from related corpus 56. When the trigram scorer results in a high score indicating likely copying of any source passage, an alert is generated and sent to a reviewer or supervisor. The alert can include information such as the original passage of interest, the source passage deemed similar, and the corpus from which the source passage was taken. Two passages may be deemed substantially similar based on different criteria. For example, if a threshold number of trigrams are found to match (e.g., three), then the passage can be flagged as suspicious. In alternative embodiments there can be scoring based on bigrams and trigrams (or unigrams, bigrams and trigrams) possibly with extra weighting for trigrams.

Figure 3:
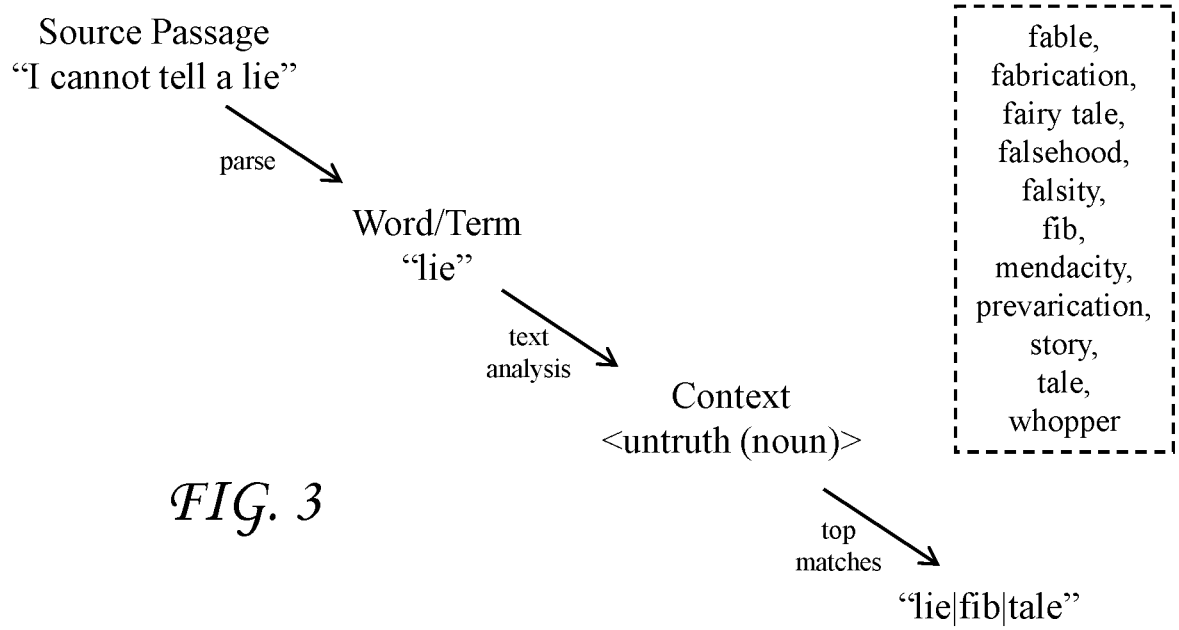
FIG. 3 is a chart illustrating how an augmented token for a source passage might be built in accordance with one implementation of the present invention.

FIG. 3 illustrates how an augmented token for a source passage might be built in accordance with one implementation of the present invention. In this example the source passage from the reference corpus is George Washington's famous statement "I cannot tell a lie". The passage is first parsed using a natural language processing engine to identify various terms, such as the word "lie". Parsing is beneficial since multiple words might be used in combination as a single term. Text analysis is then carried out to confirm the context of the particular term. Such analysis may be needed to understand the semantic meaning for which the word is being used. In this case, the word "lie" could refer to an untruth, or to the position or situation in which something lies, e.g., a golf ball in a difficult lie. For this example the analysis reveals that the term is using in the semantic sense of an untruth. The term and this semantic value are then passed to the thesaurus agent to find the possible synonyms of fable, fabrication, fairy tale, falsehood, falsity, fib, mendacity, prevarication, story, tale, whopper. While all of these synonyms may be used to form the augmented token, the agent can instead pick only the top matches up to some predetermined number (e.g., two or three). The final result in this case is the augmented token "lie|fib|tale". The vertical line (pipe) character "|" is used as the regular expression (regex) symbol for a Boolean "OR". Text analysis might also be used to select synonyms that are abbreviations or unconventional substitutions; for example, the apparent word "us" in a passage might mean "United States" and not the plural first person accusative pronoun.

Synonym sets can be created using any convenient method. They could even be client-specific if for example a teaching class or assignment had a lot of domain-specific jargon. One useful approach would be to use synonyms from an open resource like WordNet.

Figure 4:
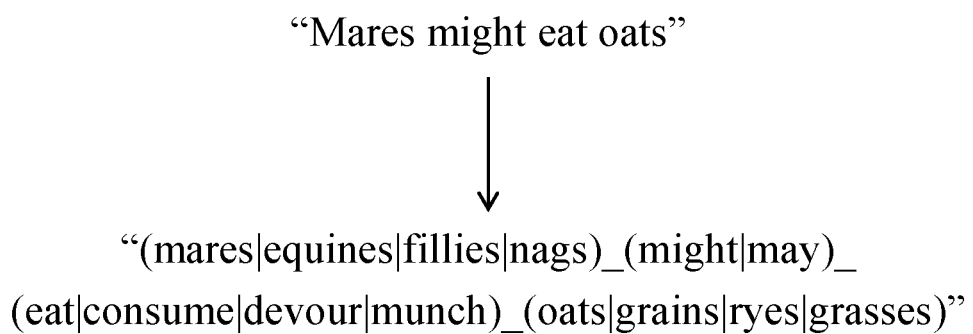
FIG. 4 is an example of a source passage being converted into a regular expression with synonyms for plagiarism detection in accordance with one implementation of the present invention.

FIG. 4 shows a further example of a source passage being converted into a regular expression using such augmented tokens. This example uses the phrase "Mares might eat oats". The thesaurus agent finds synonyms "equines", "fillies" and "nags" for "mares", synonym "may" for "might", synonyms "consume", "devour" and "munch" for "eat", and synonyms "grains", "ryes", and "grasses" for "oats". Grouping these synonyms with their respective source terms to form augmented four tokens results in the regular expression "(mares|equines|fillies|nags)_(might|may)_(eat|consume|devour|munch)_(oats|grains|ryes|grasses)". This modified passage is then compared to any suspect passage for similarity using the trigram scorer. Consider the further example where the suspect passage is "Equines might consume grains." In this case, a precision-based trigram evaluation metric would fail to register a hit—there are no trigrams in common with the original source passage. But using the modified passage above leads to a complete match for each of the four augmented-trigram tokens, causing the suspect passage to be flagged as possible plagiarism. Augmented tokens may be generated in advance for a given corpus, or may be generated on-the-fly only for the documents that are being checked for plagiarism. This approach allows the reviewer to supply a custom synonym set at runtime and save computation time.

Figure 5:
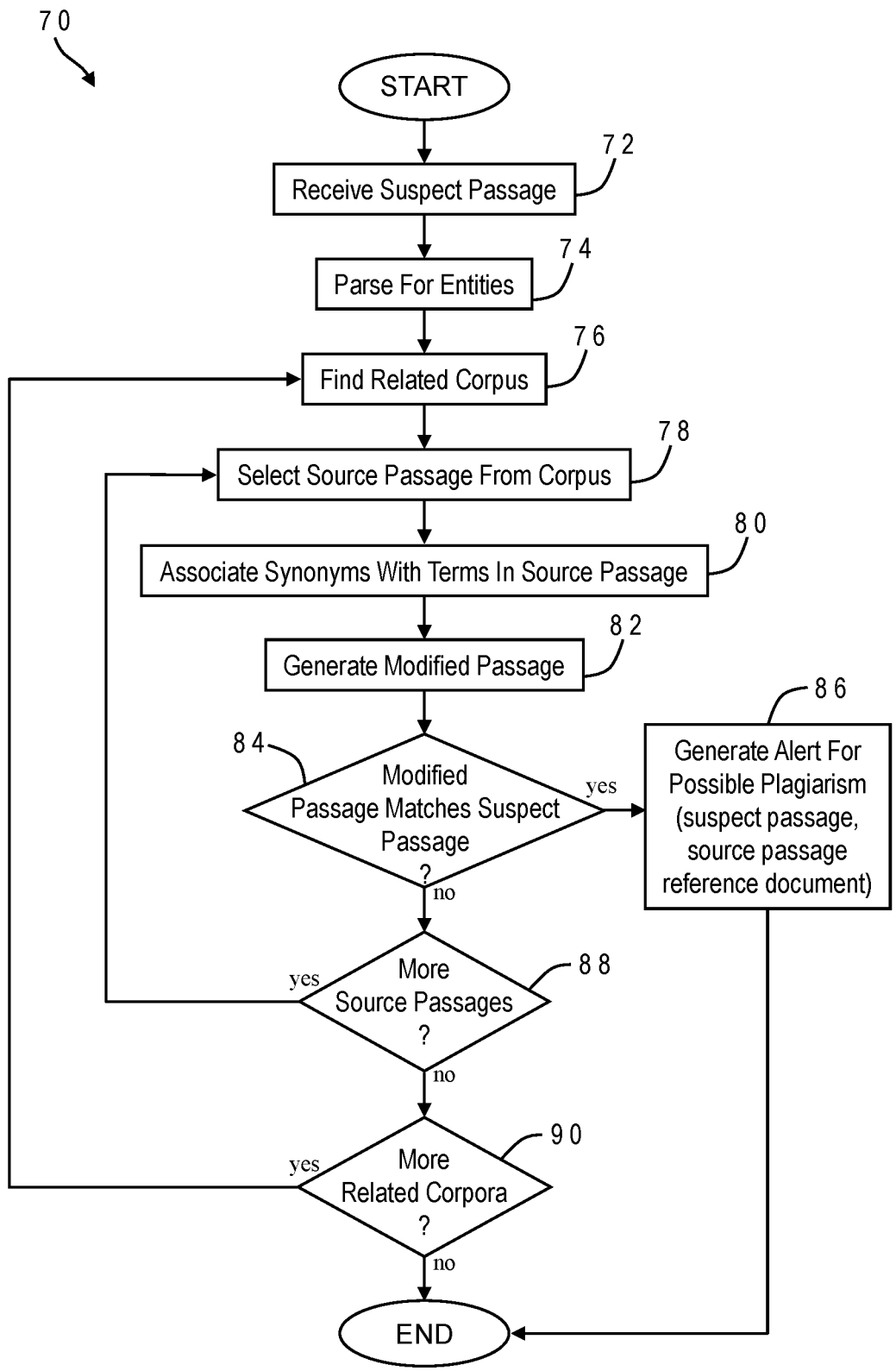
FIG. 5 is a chart illustrating the logical flow for a plagiarism detection process in accordance with one implementation of the present invention.

The present invention may be further understood with reference to the chart of FIG. 5 which shows the logical flow for a plagiarism detection process 70 in accordance with one implementation. Process 70 begins by receiving the passage under investigation 72. That passage is parsed to identify entities 74, and those entities are used to located one or more related corpora 76. Entities may be extracted using text analysis as described above. The analysis can be carried out using a deep question answering system such as the IBM Watson™ cognitive technology which employs natural language processing. The cognitive system can use a set of linguistic, statistical and machine-learning techniques to analyze the annotated text, and extract key business information such as person, location, organization, and particular objects (e.g., vehicles or books). Front-end NLP can include identification of a lexical answer type and a focus among others. Lexical answer type (LAT) and focus are known features of the prior art. A LAT is a term in a question that indicates what type of entity is being asked for, i.e., the primary concept that is being discussed. For example, in the question "What maneuver was invented in the 1500s to speed up the game and involves two pieces of the same color?", the LAT is the string "maneuver". Focus is essentially the subject of the text or, in the case of a question, the answer to the question or a reference to the answer. If the focus of a question is replaced by the answer, the question becomes a standalone statement. For example, in the question "What drug has been show to relive the symptoms of ADD with relatively few side effects", the focus is "drug" since if this word were replaced with the answer ("Adderall"), it would generate the sentence "Adderall has been shown to relieve the symptoms of ADD with relatively few side effects". The extracted entities can be used with tag matching as explained above to identify appropriate corpora. Alternatively, the system can select the corpora by scoring the likelihood that a suspect passage is related to a particular corpus using cognitive techniques, and then picking one or more of the corpora with the highest scores (confidence values). For example, the cognitive system could examine passages from any corpora whose score was above a predetermined threshold (e.g., 90%), or could examine the one corpus that had the highest score.

A source passage from a related corpus is then selected for comparison 78. The process can cycle through every passage in the corpus in order beginning with the first sentence or statement. Alternatively, the passages selected for examination could be limited to ones having at least one word or term that matches an entity extracted from the suspect passage. Synonyms are associated with the terms in the source passage 80, and a modified passage (preferably a regular expression) is generated 82 using those synonyms. The synonyms are generated automatically by reference to a thesaurus or other list of words grouped as related concepts. Text analysis may be used to establish a particular context for a term in order to point to the appropriate concept group. Other natural language processing may be used, such as correcting misspellings where necessary or lemmatizing words, that is, reducing a word to a common form or base. For example, the words "writing", "wrote", etc., can be reduced to the common word "write". The particular manner in which the modified passage is formed may relate to the plagiarism detection approach being used. Thus, for a trigram scorer, the modified passage may have augmented tokens, a given one of which will have the term from the original source passage presented in association with its found synonyms.

The modified passage is then compared to the suspect passage 84. This comparison may be performed using any plagiarism detection technique, adapted as necessary to allow processing of all of the synonyms in the augmented tokens. If the modified passage matches the suspect passage, an alert is generated. The alert message can include both the suspect passage and the source passage, as well as the particular corpus the source passage was taken from any information relating to the origin of the suspect passage, e.g., a particular test answer from a particular student. The alert can be sent via any convenient method, such as a phone call or short message service (SMS) text to the reviewer or investigator, or an email notification. Process 70 can end once any alert is generated, or can continue with further processing. If no match is found between the modified passage and the suspect passage, the process can check to see if other source passages remain in the corpus, returning iteratively to box 78. Once all source passages from that corpus have been examined, the process can further check to see if other related corpora are available, and continue iteratively at box 76.

While the present invention can be used with other plagiarism detection techniques (e.g., bag-of-words), it is particularly effective when used with trigram (or higher order n-gram) scorers. Higher-order n-grams make for very strong evidence of plagiarism—it would be totally normal for different students to use the same words or pairs of words (unigrams or trigrams) if they are completing the same or a similar assignment, just because the terminology is likely to be roughly the same regardless of the writer. When groups of words (say, trigrams or higher) are the same, it now becomes much less likely that this is attributable to random chance. Therefore, long strings of words that are the same strongly indicate plagiarism. Students know this, and sometimes try to get around it by swapping out equivalent words in the middle (e.g., "France is the world's biggest wine exporter"→"France is the planet's largest wine exporter"). By swapping out two words, instead of matching four trigrams (France-be-world, be-world-big, word-big-wine, big-wine-exporter) a conventional scorer matches zero. So synonym-swaps have an outsize impact on the most conclusive plagiarism detection method.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the illustrative implementation creates augmented tokens for the source passage from the reference corpus, but an equivalent method would be to create augmented tokens for the passage of interest and compare that to the source (unmodified) passage. It is therefore contemplated that such modifications can be made without departing from the spirit or scope of the present invention as defined in the appended claims.

What is claimed is:

1. A method of detecting plagiarism comprising:
receiving a passage of interest, by executing first instructions in a computer system;
receiving a corpus having a source passage wherein the corpus is related to the passage of interest, by executing second instructions in the computer system;
associating at least one synonym with a term in the source passage, by executing third instructions in the computer system;
creating a modified passage using the synonym wherein the modified passage has an augmented token which includes the term and the at least one synonym, by executing fourth instructions in the computer system;

comparing the modified passage to the passage of interest to determine that the modified passage is similar to the passage of interest, by executing fifth instructions in the computer system; and responsively providing an indication that the passage of interest is likely plagiarized, by executing sixth instructions in the computer system.

2. The method of claim 1 wherein said comparing uses a trigram scorer to determine that the modified passage is similar to the passage of interest.

3. The method of claim 1 wherein the augmented token forms a regular expression.

4. The method of claim 1 further comprising:

extracting one or more entities from the passage of interest; and identifying the corpus as being related to the passage of interest based on the one or more entities.

5. The method of claim 1 wherein said associating associates multiple synonyms with multiple terms in the source passage.

6. The method of claim 1 wherein said providing includes sending an alert message to a reviewer wherein the alert message includes the passage of interest, the source passage, and an identification of the related corpus.

7. A computer system comprising:

one or more processors which process program instructions;

a memory device connected to said one or more processors; and program instructions residing in said memory device for detecting plagiarism by receiving a passage of interest, receiving a corpus having a source passage wherein the corpus is related to the passage of interest, associating at least one synonym with a term in the source passage, creating a modified passage using the synonym wherein the modified passage has an augmented token which includes the term and the at least one synonym, comparing the modified passage to the passage of interest to determine that the modified passage is similar to the passage of interest, and responsively providing an indication that the passage of interest is likely plagiarized.

8. The computer system of claim 7 wherein the comparing uses a trigram scorer to determine that the modified passage is similar to the passage of interest.

9. The computer system of claim 7 wherein the augmented token forms a regular expression.

10. The computer system of claim 7 wherein said program instructions further extract one or more entities from the passage of interest, and identify the corpus as being related to the passage of interest based on the one or more entities.

11. The computer system of claim 7 wherein multiple synonyms are associated with multiple terms in the source passage.

12. The computer system of claim 7 wherein the providing includes sending an alert message to a reviewer wherein the alert message includes the passage of interest, the source passage, and an identification of the related corpus.

13. A computer program product comprising:

a computer readable storage medium; and program instructions residing in said storage medium for detecting plagiarism by receiving a passage of interest, receiving a corpus having a source passage wherein the corpus is related to the passage of interest, associating at least one synonym with a term in the source passage, creating a modified passage using the synonym wherein the modified passage has an augmented token which includes the term and the at least one synonym, comparing the modified passage to the passage of interest to determine that the modified passage is similar to the passage of interest, and responsively providing an indication that the passage of interest is likely plagiarized.

14. The computer program product of claim 13 wherein the comparing uses a trigram scorer to determine that the modified passage is similar to the passage of interest.

15. The computer program product of claim 13 wherein the augmented token forms a regular expression.

16. The computer program product of claim 13 wherein said program instructions further extract one or more entities from the passage of interest, and identify the corpus as being related to the passage of interest based on the one or more entities.

17. The computer program product of claim 13 wherein multiple synonyms are associated with multiple terms in the source passage.

* * * * *